United States Patent [19]

Kortering et al.

[11] 4,448,459

[45] May 15, 1984

[54] ROADABLE TRACK SHOE WITH SEALED GROUSER

[75] Inventors: Randall L. Kortering; Danny J. Becker, both of Peoria, Ill.

[73] Assignee: Caterpillar Tractor Co., Peoria, Ill.

[21] Appl. No.: 385,416

[22] PCT Filed: Apr. 13, 1982

[86] PCT No.: PCT/US82/00458

§ 371 Date: Apr. 13, 1982

§ 102(e) Date: Apr. 13, 1982

[87] PCT Pub. No.: WO83/03583

PCT Pub. Date: Oct. 27, 1983

[51] Int. Cl.³ ........................ B62D 55/20; B62D 55/26

[52] U.S. Cl. ........................................ 305/38; 305/54

[58] Field of Search .................... 152/185.1; 305/35 R, 305/38, 51, 54, 46, 11

[56] References Cited

U.S. PATENT DOCUMENTS

| | | | |
|---|---|---|---|
| 1,296,512 | 3/1919 | Hatfield . | |
| 1,314,722 | 9/1919 | White . | |
| 1,635,596 | 7/1927 | White . | |
| 3,017,225 | 1/1962 | Ruf | 305/51 |
| 4,165,906 | 8/1979 | Fix | 305/51 |
| 4,303,278 | 12/1981 | Fehling | 305/35 R |

FOREIGN PATENT DOCUMENTS

| | | | |
|---|---|---|---|
| 739577 | 9/1943 | Fed. Rep. of Germany | 305/38 |
| 1152631 | 8/1963 | Fed. Rep. of Germany | 305/38 |
| 1268995 | 5/1968 | Fed. Rep. of Germany | 305/38 |
| 2849631 | 9/1979 | Fed. Rep. of Germany | 305/54 |
| 54-109844 | 8/1979 | Japan . | |
| 54-111035 | 8/1979 | Japan . | |
| 1016757 | 1/1966 | United Kingdom | 305/38 |

*Primary Examiner*—David A. Scherbel
*Attorney, Agent, or Firm*—O. Gordon Pence

[57] ABSTRACT

Roadable track shoes employed on track-type vehicles, such as an agricultural tractor, each include at least one elastomeric grouser having a steel anchor plate bonded thereto. Bolting of the anchor plate on a track shoe normally provides exposed bonded edges that are subjected to high tensile stresses or failure during tractor operation. In addition, soil and the like tends to ingress into the bonded edges to further induce bond failure. The grouser assembly (11) of this invention overcomes these problems by providing a compressed lip portion (27) of an elastomeric grouser (12) between a rib (24) formed integrally on the track shoe and each outer side (28) of an anchor plate (13). In addition, a static seal (30) is formed between the lip portion (27) of the grouser (12) and the rib (24).

4 Claims, 6 Drawing Figures

FIG-1
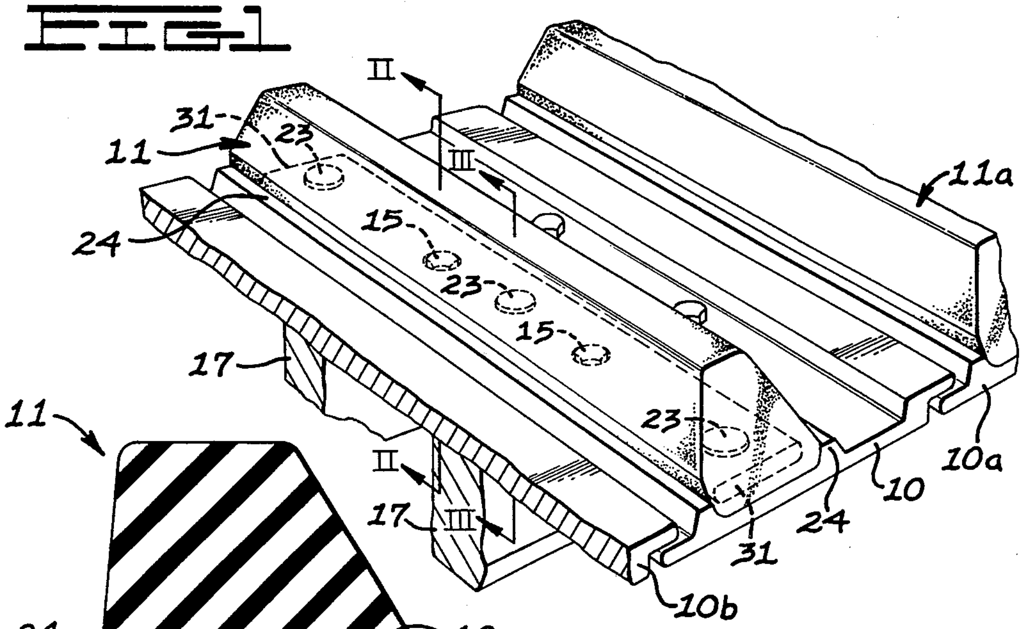
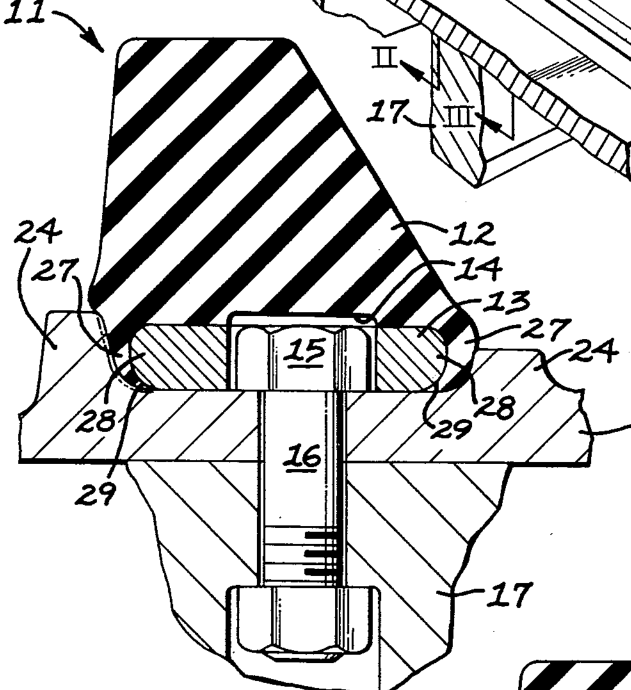
FIG-2
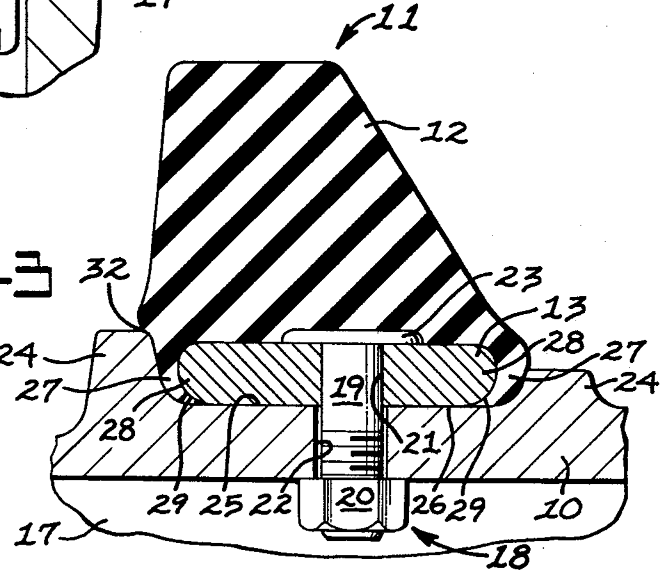
FIG-3

ROADABLE TRACK SHOE WITH SEALED GROUSER

TECHNICAL FIELD

This invention relates generally to a track shoe and elastomeric grouser assembly adapted for use in an endless track assembly and more particularly to the precompression and sealing of the elastomeric grouser on the track shoe.

BACKGROUND ART

Rubber-tired tractors have long been preferred by agricultural farmers over track-type tractors since the rubber-tired tractors have roading capabilities; that is, they cause relatively little damage to road surfaces. To adapt a track-type tractor to agricultural use, it has been the practice to alter the track shoes of the track-type tractor for roading purposes by attaching rubber grousers thereto. Typically, this is accomplished by bonding a rubber grouser to the outer face of a steel anchor plate which is, in turn, bolted to the track shoe. A typical such grouser arrangement is disclosed in U.S. Pat. No. 1,635,596, issued on July 12, 1927 to R. H. White.

A common problem encountered with known rubber grouser arrangements is that during operation, moisture and particles of soil, rock, ice, and the like are forced into the bonded boundary area between the rubber grouser and the steel anchor plate. The bond between the steel and rubber thus becomes progressively weakened and destroyed, requiring repair or replacement of the rubber grousers. Furthermore, in operation of known roadable track-type tractors, portions of the rubber grouser adjacent to the anchor plate are subjected to high tensile stresses in operation, further promoting bond failure of the rubber grouser-anchor plate assembly.

The present invention is directed to overcoming one or more of the problems as set forth above.

DISCLOSURE OF INVENTION

In one aspect of the present invention, a grouser assembly is secured on a track shoe, the grouser assembly including an elastomeric grouser and an anchor plate bonded to the grouser. The invention further includes positioning the anchor plate between a pair of laterally-spaced ribs secured on the track shoe and wrapping a pair of lip portions of the elastomeric grouser over opposite sides of the anchor plate. Each lip portion is thereby compressed between a track shoe rib and a corresponding one of the fore and aft sides of the anchor plate to form a static seal thereat. This arrangement also establishes a compressive preloading of the elastomeric material intermediate the anchor plate and the ribs.

The compressive pre-load thus imposed on the lip portions of the grouser, positioned at regions of the grouser assembly which are normally highly stressed during operation of the track shoe, serves to substantially isolate the bonded boundary area between the anchor plate and the grouser in order to substantially reduce the chances of bond failure thereat. Stresses imposed on the bolts attaching the grouser assembly on the track shoe are reduced to thus reduce the number and size of the bolts required. In addition, the compressed lip portions form static seals to prevent the ingress of moisture, dirt and the like to the bond region, which could further promote bond failure.

BRIEF DESCRIPTION OF THE DRAWINGS

Other advantages and objects of this invention will become apparent from the following description and accompanying drawings wherein:

FIG. 1 is a perspective view of a track shoe having a grouser assembly embodiment of the present invention secured thereon, for the purpose of reference the positions of the adjoining track shoes are shown;

FIG. 2 is an enlarged view illustrating the track shoe bolted to a track link with the grouser assembly being shown in its secured position, the view being taken in lateral cross section as indicated by arrows II—II in FIG. 1, in this view displacement of the elastomeric material of the grouser due to compressive loading is shown in somewhat exaggerated form for the purpose of illustration;

FIG. 3 is a view similar to FIG. 2, but illustrates means for attaching the grouser assembly to the track shoe, the view being taken generally in the direction of arrows III—III in FIG. 1, in this view displacement of the elastomeric material of the grouser due to compressive loading is shown in somewhat exaggerated form for the purpose of illustration;

BEST MODE OF CARRYING OUT THE INVENTION

Figure 4:
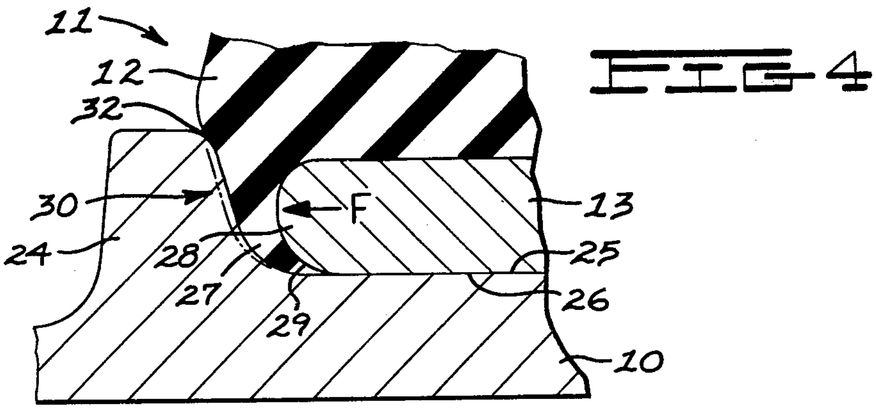
FIG. 4 is an enlarged sectional view of a grouser assembly illustrating compression of a lip portion of a rubber grouser between a rib of the track shoe and an anchor plate, in this embodiment little or no excess elastomeric material is provided in the bevel region.

FIG. 1 illustrates a rolled-section steel track shoe 10 having a grouser assembly 11, secured thereon. Although FIG. 1 illustrates a single grouser assembly 11 secured to the track shoe 10, two or more grouser assemblies 11 could be secured to each track shoe 10, depending on the requirements of the application under consideration. In addition, although the track shoe 10 having a grouser assembly 11 has particular applicability to track assemblies for roadable track-type vehicles, such as agricultural tractors and excavators, it could also be applied to track belts for use on rubber tires. It will be noted that FIG. 1 also shows portions of the adjoining track shoes **10*a* and 10*b* for the purpose of clearly illustrating the position of the track shoe 10 and grouser assembly 11** in the track chain assembly.

Referring to FIGS. 1-3, the grouser assembly 11 includes an elastomeric grouser 12, preferably composed of natural rubber with suitable additives to provide the desired mechanical and chemical properties. A metallic anchor plate 13, preferably in the form of a steel insert, is bonded in partially-encapsulated form within the elastomeric grouser 12 by conventional compression molding techniques. Alternatively this bonding can be effected by other techniques, such as by injection molding or transfer molding, as will be recognized by those skilled in the art. The anchor plate 13 is formed with a plurality of longitudinally-spaced holes 14 there-through, each to accommodate a head 15 of a bolt 16. The bolts 16 serve to secure the track shoe 10 to the associated link 17 of the track chain assembly (FIG. 2).

As best shown in FIG. 3, a plurality of fasteners 18, preferably each including a torque resistant clinch stud 19 and a nut 20, releasably secure the anchor plate 13 and the grouser 12 to the track shoe 10. Bolts, such as square-shank carriage bolts, could be utilized in place of the torque resistant clinch studs 19. The clinch studs 19 are preferably of the round-shank variety. The shank of the clinch stud 19 is preferably serrated and extends downwardly through a bore 21 formed through the anchor plate 13 and an aligned bore 22 formed through the track shoe 10 for attachment to the nut 20. Prior to compression molding of the grouser assembly 11, the serrated shank portion of the clinch stud 19 is press-fitted into the bore 21 with a head 23 of the clinch stud 19 engaging an upper side of the anchor plate 13. Alternatively, the clinch stud 19 could be resistance welded in position in the anchor plate bore 21. Following the molding of the grouser assembly 11, the clinch stud head 23 is encapsulated by the elastomeric material forming the grouser 12.

The track shoe 10 has a pair of laterally-spaced, protruding ribs 24 formed integrally therewith, each having a height substantially less than the height of the grouser assembly 11. As shown in FIG. 3, a flat outer bearing surface 25 is formed on the track shoe 10 at a point intermediate the ribs 24 to engage a flat bearing surface 26 formed on the underside of the anchor plate 13 when the grouser assembly 11 is secured to the track shoe 10 by the fasteners 18. This substantially large area of contact between the contact surfaces 25,26 will provide the integrated track shoe 10 and grouser assembly 11 with a high degree of structural integrity.

Figure 5:
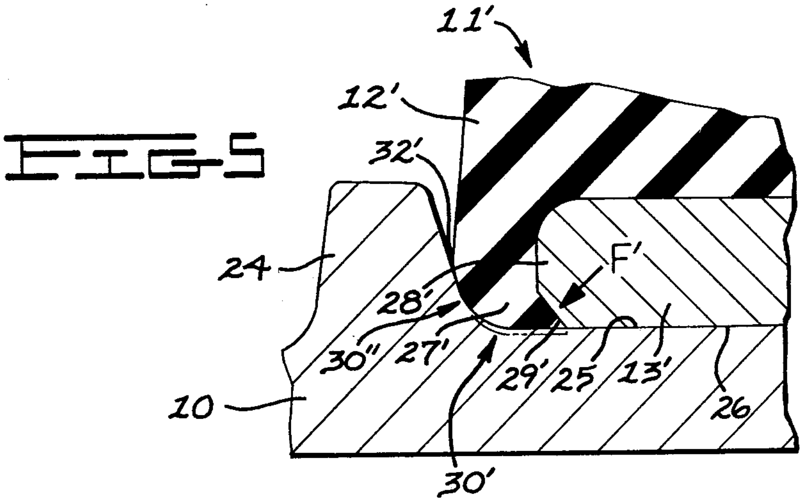
FIG. 5 is an enlarged sectional view similar to FIG. 4, but illustrating an embodiment in which there is excess elastomeric material substantially only in the bevel region.

As shown most clearly in FIGS. 2–6, the elastomeric grouser 12 has a pair of lip portions 27 bonded in wrapped-around relationship over opposite sides 28 of the anchor plate 13. Each of the opposed sides 28 of the anchor plate 13 preferably has a radiused or chamfered surface 29, shown best in FIGS. 2–5, formed adjacent the anchor plate bearing surface 26 and throughout its length. This radiused or chamfered surface 29 permits the corresponding lip portion 27 to be tucked-in to locate the bond edge formed thereat, with the anchor plate 13, substantially inwardly from adjacent rib 24 and underneath the anchor plate 13. The term "bevelled" will henceforth be used to describe any configuration of that portion of the anchor plate 13 in contact with the track shoe 10 which serves to allow the elastomeric material of the grouser 12 to occupy a position substantially beneath the anchor plate opposite sides 28. This bevelling may take the form of a chamfered edge as shown in FIG. 5, or a radiused edge as shown in FIGS. 2–4. There is no bevelling in that embodiment shown in FIG. 6. As shown in FIG. 1, there is preferably also elastomeric material extending around each of the opposite ends 31 of the anchor plate 13, these opposite ends 31 preferably being bevelled in a manner similar to that detailed previously.

Referring to FIG. 4, the ribs 24, the grouser lip portions 27, and the anchor plate outer sides 28, are suitably configured to provide a clamping force F which serves to compress the midportion of the lip 27 with a predetermined preload, between each rib 24 and the corresponding outer side 28 of the anchor plate 13. The uncompressed position of the grouser 12, slightly exaggerated, is shown in hidden line. This compressive preload will serve to keep the flexing of the grouser 12 from imposing undue tensile stresses on lip portion 27, which constitutes the region of the grouser 12 otherwise normally subjected to the highest stresses. This serves to prevent the anchor plate-grouser bond from being placed in tension. It has been found that the imposition of tension at this point is a significant contributor to degradation of the bond affixing the grouser 12 to the anchor plate 13. This bond survives well in compression but poorly in tension.

Thus, the bonded area between the anchor plate 13 and the grouser lip portion 27 in the area of the bevel 29 will be substantially protected against the imposition of tensile stresses thereon. This tensile stress-free condition also enables the grouser assembly 11 to employ fewer and smaller sized bolts 19 than would otherwise be required. In addition, compression of the lip portion 27 between the anchor plate 13 and the rib 24 in this manner will form a static seal between each lip portion 27 and the corresponding rib 24. This seal will function to prevent the ingress of moisture, dirt and other bond-degrading materials into the bond area at the bevel 29, hence acting to further prolong the service life of the grouser assembly 11.

FIG. 5 illustrates a modification of the grouser assembly 11′ wherein a lip portion 27′ of the grouser 12′ assumes a slightly different configuration. In this embodiment, securance of the grouser assembly 11′ on the track shoe 10 will impose a downwardly directed force F′ relative to that embodiment of FIGS. 2–4 to form a static seal on the bearing surface 25 of the track shoe. This compression intermediate the bevelled region 29′ and the track shoe 10 is achieved by providing the grouser 12′ with a slight excess of elastomeric material in the region of the bevel 29′ such that in its uncompressed state, the elastomeric material extends somewhat beneath the bottom bearing surface 26 of the anchor plate 13′. The uncompressed configuration of the elastomeric material is shown in somewhat exaggerated form by phantom line in FIG. 5. Thus, when the grouser assembly 11′ is affixed to the track shoe 10, this excess material is compressed ensuring sealing intermediate this elastomeric material and the track shoe 10. The bottom portion of the lip portion 27′ would also be slightly compressed due to compression induced flow of the elastomeric material adjacent the bevel 29′. This establishes a corner seal 30″ which, to some degree, serves the purposes described above in respect to the grouser assembly 11 of FIG. 4. It should be understood that concepts detailed in FIGS. 4 and 5 are combined in a single grouser application of the preferred embodiment, shown in FIGS. 1–3, to thus provide combined side, bottom and corner seals 30,30′30″, as well as the desired compressive preload on the lip portion 27. The uncompressed position of the elastomeric material on the preferred embodiment is indicated by phantom line in FIG. 2. FIGS. 2 and 3 also show slight bulging of the elastomeric material adjacent the boundary of the grouser assembly—track shoe contact 32. This is due to compression induced displacement of the excess elastomeric material in the lip portion 27 and bevel area 29.

Figure 6:
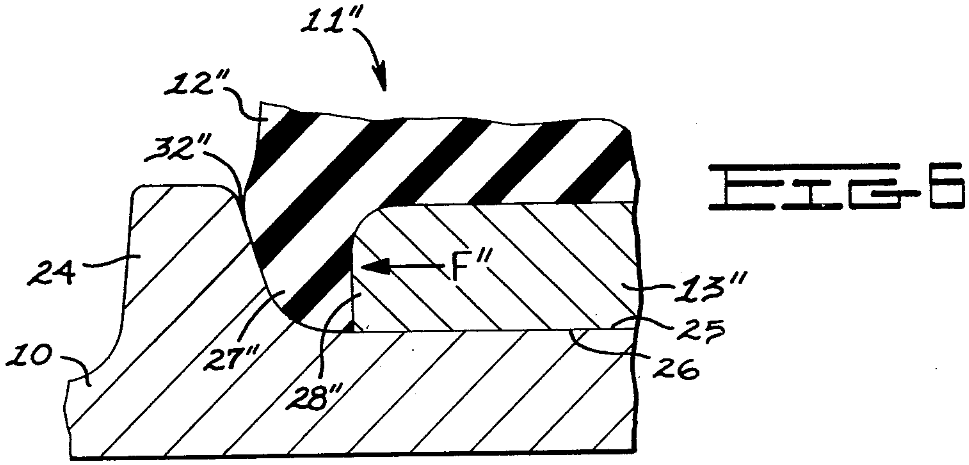
FIG. 6 is a view similar to those of FIGS. 4 and 5, but showing an embodiment in which the anchor plate is not bevelled.

FIG. 6 illustrates a modified grouser assembly 11″ wherein each outer side 28″ of an anchor plate 13″ is generally flat, i.e., the chamfer 29 has been eliminated. In this modification, a lip portion 27″ of an elastomeric grouser 12″ is compressed between outer side 28″ of the anchor plate and rib 24 under a predetermined preload force F″ upon securance of the grouser assembly 11″ to the track shoe 10. A static seal is thus formed between each rib 24 and the corresponding lip portion 27" to seal-out dirt, moisture, and the like from the bond region at 28".

INDUSTRIAL APPLICABILITY

The grouser assembly 11 finds particular application to track shoes employed on a track assembly for a track-type vehicle, such as an agricultural tractor. The tractor incorporating the present development is thus adapted to travel over roads and highways without causing damage to the surfaces thereof.

The grouser assembly 11 can be compression molded and suitably bolted to the track shoe 10, as illustrated in FIG. 1. Other suitable molding techniques, as will be recognized by those skilled in the art, are also acceptable. As discussed above and as shown in FIG. 4, bolting and clamping of the grouser assembly 11 on the track shoe 10 at a position intermediate the ribs 24 by fasteners 18 will place each lip portion 27 in compression. This greatly aids in maintaining the integrity of bond between the elastomeric material and the anchor plate 13. In addition, this compression will also form a static seal 30 to prevent the ingress of dirt, moisture and other bond-degrading materials and the like into the bond region between the anchor plate and grouser in the area of chamfer 29. We have found that sealing against the ingress of moisture into the bond region is of great advantage. This is due to the fact that moisture can cause rust which, with time, would travel across the bond line greatly weakening the bond. The metal-to-metal contact between flat surfaces 25,26 of the track shoe and anchor plate will aid in securely retaining the grouser assembly on the track shoe during operation of the tractor.

We are aware that various known roadable track shoe-grouser assemblies have utilized some form of mechanical clamping or entrapment of an elastomeric grouser to an anchor plate. Our development of a roadable track shoe-grouser assembly in which the elastomeric grouser is bonded to the anchor plate with portions of the elastomeric grouser being firmly compressed between ribs on the track shoe and the anchor plate provides numerous advantages as previously detailed. We have found it especially advantageous to utilize an embodiment of our present development in which the elastomeric grouser lip portion 27 is firmly compressed between the track shoe rib 24 and the anchor plate 13 over the entire area of contact of the rib 24 with the lip 27. A substantial area of non-compressive lip 27-rib 24 contact allows deleterious entry of particulate matter which becomes entrapped therein providing a path for moisture to enter this critical interface. It is very important to prevent moisture from reaching the metal-elastomer interface. Thus, in our preferred embodiment the clamping force exists from the bounds of rib-elastomer contact 32, to the bevelled region 29.

Other aspects, objects, and advantages of this invention can be obtained from a study of the drawings, the description, and the appended claims.

We claim:

1. In a track shoe (10) having a roadable grouser assembly (11), said grouser assembly (11) extending the length of said shoe (10) and including an elastomeric grouser (12) and an anchor plate (13) bonded to said grouser (12), the improvement comprising:

said track shoe (10) having a pair of laterally-spaced ribs (24), each rib (24) being of a height substantially less than the height of said grouser assembly (11);

said track shoe (10) having a pair of laterally-spaced ribs (24), each rib (24) being of a height substantially less than the height of said grouser assembly (11);

said anchor plate (13) having a flat bearing surface (26) and opposite lateral sides (28), said anchor plate (13) being secureable to said track shoe (10) along said bearing surface (26) at a location between said ribs (24); and said grouser (12) having a pair of lip portions (27), said lip portions (27) each extending in wrapped relationship around and being bonded to the entirety of its respective anchor plate side (28) and locating the bond edge along the anchor plate bearing surface (26), at least one of said lip portions (27) being of a size such that in response to said grouser assembly (11) being affixed to said track shoe, said lip portion (27) is compressed only between its respective rib (24) and anchor plate side (28) to a preselected magnitude sufficient to measurably reduce the magnitude of stresses subjectable upon said bonded portion of said lip portion (27) during flexing of said grouser (12).

2. A track shoe, as set forth in claim 1, wherein each anchor plate side (28) is bevelled and the terminus of each lip portion is bonded to a portion of a respective bevelled portion at a location between the shoe (10) and the sides (28).

3. A track shoe (10), as set forth in claim 2, wherein said anchor plate (13) has opposed longitudinal ends (31) and said grouser (12) extends around each of said ends (31) and into contact with said track shoe (10).

4. A track shoe (10), as set forth in claim 1, wherein said anchor plate (13) has a flat underside surface (26) and portions of each of said lip portions (27) extend beyond said flat underside surface (26) in the uncompressed state of said lip portions (27) and define a static seal between said lip portion (27) and said shoe (10) in the compressed state of said lip portions (27).

* * * * *